(12) United States Patent
Huang et al.

(10) Patent No.: US 10,508,232 B2
(45) Date of Patent: Dec. 17, 2019

(54) POLYMER COMPOSITES AND FILMS COMPRISING REACTIVE ADDITIVES HAVING THIOL GROUPS FOR IMPROVED QUANTUM DOT DISPERSION AND BARRIER PROPERTIES

(71) Applicant: Dow Global Technologies LLC, Midland, MI (US)

(72) Inventors: Jessica Ye Huang, Midland, MI (US); Liang Chen, Midland, MI (US); Yiyong He, Midland, MI (US); Xiaoyun Chen, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 148 days.

(21) Appl. No.: 15/880,860

(22) Filed: Jan. 26, 2018

(65) Prior Publication Data

US 2018/0265774 A1 Sep. 20, 2018

Related U.S. Application Data

(60) Provisional application No. 62/459,904, filed on Feb. 16, 2017.

(51) Int. Cl.
| | |
|---|---|
| *C09K 11/02* | (2006.01) |
| *C08L 67/04* | (2006.01) |
| *C08F 2/44* | (2006.01) |
| *C08G 75/045* | (2016.01) |
| *C08L 25/00* | (2006.01) |
| *C08L 35/02* | (2006.01) |
| *C09K 11/62* | (2006.01) |
| *C09K 11/08* | (2006.01) |
| *C08K 3/105* | (2018.01) |
| *C08K 3/11* | (2018.01) |
| *C08K 3/32* | (2006.01) |
| *B82Y 20/00* | (2011.01) |

(52) U.S. Cl.
CPC ............. *C09K 11/02* (2013.01); *C08F 2/44* (2013.01); *C08G 75/045* (2013.01); *C08L 25/00* (2013.01); *C08L 35/02* (2013.01); *C08L 67/04* (2013.01); *C09K 11/62* (2013.01); *B82Y 20/00* (2013.01); *C08K 3/105* (2018.01); *C08K 3/11* (2018.01); *C08K 3/32* (2013.01); *C08L 2203/20* (2013.01); *C08L 2666/54* (2013.01); *C09K 11/0811* (2013.01); *C09K 11/0883* (2013.01); *Y10S 977/774* (2013.01); *Y10S 977/816* (2013.01); *Y10S 977/818* (2013.01); *Y10S 977/819* (2013.01); *Y10S 977/824* (2013.01); *Y10S 977/95* (2013.01); *Y10S 977/952* (2013.01)

(58) Field of Classification Search
None
See application file for complete search history.

(56) References Cited

U.S. PATENT DOCUMENTS

| | | | |
|---|---|---|---|
| 6,322,901 B1 | 11/2001 | Bawendi et al. | |
| 7,557,028 B1 | 7/2009 | Scher et al. | |
| 7,588,828 B2 | 9/2009 | Mushtaq et al. | |
| 8,062,967 B1 | 11/2011 | Scher et al. | |
| 8,884,273 B1 | 11/2014 | Scher et al. | |
| 9,085,728 B2 | 7/2015 | Uchida et al. | |
| 9,136,428 B2 | 9/2015 | Clough et al. | |
| 9,212,056 B2 | 12/2015 | Breen et al. | |
| 9,469,538 B1 | 10/2016 | Scher et al. | |
| 2010/0204435 A1* | 8/2010 | Ebata | C08G 63/06 528/361 |
| 2012/0113672 A1 | 5/2012 | Dubrow et al. | |
| 2013/0148057 A1 | 6/2013 | Kang et al. | |
| 2015/0047765 A1 | 2/2015 | Vo et al. | |
| 2015/0083970 A1 | 3/2015 | Koh et al. | |
| 2015/0166342 A1 | 6/2015 | Liu et al. | |
| 2015/0236195 A1 | 8/2015 | Guo et al. | |

(Continued)

FOREIGN PATENT DOCUMENTS

| | | |
|---|---|---|
| CN | 102618035 B | 10/2013 |
| WO | 2011036446 A1 | 3/2011 |

(Continued)

OTHER PUBLICATIONS

Huo, Z. et al., "A novel polysulfide hydrogel electrolyte based on low molecular mass organogelator for quasi-solid-state quantum dot-sensitized solar cells". Journal of Power Sources 2015, 284, 582-587. (Year: 2015).*

Behrendt, J. M. et al. "Thiol-containing microspheres as polymeric ligands for the immobilisation of quantum dots". J. Mater. Chem. 2009, 19, 215-221. (Year: 2009).*

Liu, W. et al. "Compact Cysteine-Coated CdSe(ZnCdS) Quantum Dots for in Vivo Applications". J. Am. Chem. Soc. 2007, 129, 14530-14531. (Year: 2007).*

(Continued)

*Primary Examiner* — Richard A Huhn

(74) *Attorney, Agent, or Firm* — S. Matthew Cairns

(57) ABSTRACT

The present invention provides polymer composites, such as films, having dispersed therein quantum dots, wherein the polymer comprises (b) polymerized units of a first compound comprising from one to 6 thiol groups, the compound having a molecular weight from 300 to 20,000 and having at least one continuous acyclic hydrocarbyl chain of at least three carbon atoms, or, preferably, at least 5 carbon atoms; and (c) polymerized units of a second compound having a molecular weight from 100 to 750 and comprising at least two polymerizable vinyl groups as part of a (meth)acrylate ester group or attached directly to an aromatic ring and, wherein the molecular weight of the first compound minus the molecular weight of the second compound is at least 100. The polymer composites provide more stably dispersed and durable quantum dot compositions for use in, for example, display devices.

10 Claims, No Drawings

(56) References Cited

U.S. PATENT DOCUMENTS

| | | | | |
|---|---|---|---|---|
| 2016/0032160 A1* | 2/2016 | Koh | ............................ | C09J 4/00 |
| | | | | 428/1.52 |
| 2017/0317246 A1* | 11/2017 | Kang | .................... | C08G 75/045 |
| 2018/0059442 A1* | 3/2018 | Youn | ....................... | C09K 11/02 |
| 2018/0345638 A1* | 12/2018 | Smith | ................. | C09K 11/025 |

FOREIGN PATENT DOCUMENTS

| | | | |
|---|---|---|---|
| WO | 2014113562 A1 | 7/2014 | |
| WO | 2015145184 A1 | 10/2015 | |

OTHER PUBLICATIONS

Definition of hydrocarbyl. IUPAC. Compendium of Chemical Terminology, 2nd ed. (the "Gold Book"). Compiled by A. D. McNaught and A. Wilkinson. Blackwell Scientific Publications, Oxford (1997). Online version (2019-) created by S. J. Chalk. Retrieved from https://goldbook.iupac.org on Aug. 14, 2019. (Year: 1997).*

* cited by examiner

POLYMER COMPOSITES AND FILMS COMPRISING REACTIVE ADDITIVES HAVING THIOL GROUPS FOR IMPROVED QUANTUM DOT DISPERSION AND BARRIER PROPERTIES

The present invention relates to a polymer composite containing quantum dots, especially polymer composites containing cadmium-free quantum dots.

Semiconductor quantum dots (QD) provide optical absorption and emission (photoluminescence PL or electroluminescence EL) behaviors that are significantly different from those of bulk materials. As the particle size decreases, the effective energy bandgap (Eg) between available energy levels increases and creates a blue shifted PL spectrum. Such spectral tunability by the particle size dependent quantum confinement effect within the same material provides a critical advantage over conventional bulk semiconductors. Because of their unique optical properties, QD have found interest in many display and lighting applications. Many QD have inorganic shells made of a larger bandgap material to confine electron and hole pairs within the core region and prevent any surface charge states. The outer shells or the QD themselves are then capped by organic ligands to reduce trap states of the shell that can lead to reduced quantum yield (QY). Typical organic ligands surrounding QD help QD to disperse in organic/aqueous solvents and have relatively long alkyl chains which provide high solubility in non-polar solvents or monomers. Unfortunately, QD are very susceptible to photo-oxidation during the light absorption and/or light conversion process. Also, moisture can have a similar impact. QD typically are encapsulated in a polymer matrix to protect them from adverse effects of water and oxygen; however, the polymer matrix should be compatible with both the QD and any ligand used.

Monomers used to form a polymer matrix, such as tricyclodecane dimethanol diacrylate or isobornyl dimethacrylate, are known to have good $O_2$ barrier properties and yet poor compatibility with QD, resulting in QD agglomeration which causes lower quantum yield.

U.S. patent application no. US 2013/0148057 A to Kang et al. (Kang) discloses backlight units for a liquid crystal display (LCD) including a light emitting diode (LED) and a light conversion layer to convert light emitted from the LED to white light. The light conversion layer comprises quantum dots or semiconductor nanoparticles and a polymer matrix. The polymer matrix comprises a polymer of a first polymerized monomer having at least two terminal thiol groups and a second monomer having at least two terminal unsaturation functional groups. However, the Kang light conversion layer does not provide acceptable oxygen permeability or quantum yield.

The present inventors have endeavored to provide polymer composites containing QD and films thereof having improved oxygen barrier and quantum yield properties.

SUMMARY OF THE INVENTION

The present invention provides a polymer composite having dispersed therein quantum dots, the polymer composite comprising: (a) quantum dots; (b) polymerized units of a first compound comprising at least one or, preferably, from one to 6 thiol groups, or, preferably, from two to 6 thiol groups, and having a molecular weight from 300 to 20,000 or, preferably, from 300 to 6000 and at least one continuous acyclic hydrocarbyl chain of at least three carbon atoms, or, preferably, at least five carbon atoms; and (c) polymerized units of a second compound having a molecular weight from 100 to 750 and comprising at least two polymerizable vinyl groups as part of a (meth)acrylate ester group or attached directly to an aromatic ring and, wherein the molecular weight of the first compound minus the molecular weight of the second compound is at least 100.

In accordance with the polymer composite of the present invention, the (a) quantum dots are cadmium-free such as, for example, ZnS, ZnSe, ZnTe, HgS, HgSe, HgTe, GaN, GaP, GaAs, InP, InAs or a combination thereof.

Preferably, the quantum dots in the polymer composite of the present invention have a core shell structure wherein the shell material has a wider band gap than and a small lattice mismatch to the core material. More preferably, such core shell quantum dots are cadmium free quantum dots, such as, preferably, quantum dots having an indium containing core, and such as, preferably, quantum dots having a III-V nanoparticle core, such as GaAs, InP, or GaP, and a II-VI nanoparticle shell, such as ZnS, ZnSe.

In accordance with the polymer composite of the present invention, the first compound used to make the polymerized units (b) further comprises at least one hydroxyl group.

In accordance with the polymer composite of the present invention, the first compound used to make the polymerized units (b) is one or more adducts of N-alkylamine thiols or thiol group containing amino acids, such as cysteine, with $C_{12}$-$C_{26}$ aliphatic hydroxycarboxylic acids, such as oligo (12-hydroxystearic acid) adducts with N-alkylamine thiols, such as N-ethylamine thiol; adducts of N-alkylamine thiols or thiol group containing amino acids with $C_{12}$-$C_{26}$ aliphatic carboxylic acids or their dimers; and adducts of thio alkylcarboxylic acids, such as mercaptopropionic acid with $C_{12}$-$C_{26}$ aliphatic diols or triols or their dimers; or thiol grafted compounds made with, for example, adducts of thio alkylcarboxylic acids with oligomers of one or more $C_4$ to $C_{16}$ hydroxyalkyl (meth)acrylates, or, preferably, one or more $C_5$ to $C_{16}$ hydroxyalkyl (meth)acrylates.

In accordance with the polymer composite of the present invention, the first compound used to make the polymerized units (b) is, preferably, a hydroxy fatty acid amide having a terminal thiol group, an oligo(hydroxy fatty acid) amide having a terminal thiol group, wherein the fatty acid chain contains a hydroxyl group located three or more or, preferably, from 5 to 6 carbons from the end of the fatty acid chain, such as the thiolethylamide of 12-hydroxystearic acid or the thiolethylamide of oligo(12-hydroxystearic acid).

In accordance with the polymer composite of the present invention, the second compound used to make the polymerized units (c) comprises a monomer chosen from one having (meth)acrylate ester groups attached to an aromatic ring or a cycloaliphatic group, such as tricyclodecane dimethanol diacrylate or isobornyl dimethacrylate, one having vinyl groups directly attached to an aromatic ring or a cycloaliphatic group, such as divinyl benzene, or mixtures thereof.

In accordance with the polymer composite of the present invention, wherein the second compound used to make the polymerized units (c) is chosen from tricyclodecane dimethanol diacrylate, isobornyl dimethacrylate, divinyl benzene, or mixtures thereof.

In accordance with the polymer composite of the present invention, the polymer composite comprises (a) from 0.001 to 5 wt. % or, preferably, from 0.01 to 5 wt. % or, more preferably, from 0.1 to 5 wt. % of quantum dots, (b) from 0.5 to 40 wt. % or, preferably, from 0.5 to 10 wt. % of polymerized units of the first compound, and (c) from 55 to 95 wt. % or from 55 to 94.999 wt. % or from 55 to 94.99 wt.

% or from 55 to 94.9 wt. %, or, preferably, from 65 to 92 wt. % of polymerized units of the second compound, all amounts based on the total solids in the polymer composite.

In accordance with the polymer composite of the present invention, the polymer composite preferably comprises a film.

In accordance with the film polymer composite of the present invention, the polymer composite comprises part of a multilayer film, laminate or assembly which also comprises an outer layer on each side of the polymer composite film. Preferably, the outer layer is an oxygen barrier, such as, for example, polyethylene terephthalate (PET) which also inhibits passage of moisture.

Unless otherwise specified, percentages are weight percentages (wt. %) and temperatures are in ° C.

Unless otherwise specified, operations and examples were performed at room temperature (20-25° C.).

Unless otherwise specified, boiling points are measured at atmospheric pressure (ca. 101 kPa).

Unless otherwise indicated, any term containing parentheses refers, alternatively, to the whole term as if no parentheses were present and the term without them, and combinations of each alternative. Thus, the term "(meth) acrylate" means acrylate, methacrylate or mixtures thereof.

All ranges are inclusive and combinable. For example, the term "a range of 50 to 3000 cPs, or 100 or more cPs" would include each of 50 to 100 cPs, 50 to 3000 cPs and 100 to 3000 cPs.

As used herein, the term "ASTM" refers to publications of ASTM International, West Conshohocken, Pa.

As used herein, the term "band gap" refers to the energy gap between the highest occupied molecular orbital (HOMO) and the lowest unoccupied molecular orbital (LUMO) in a given quantum dot or layer thereof, as measured by ultraviolet photoelectron spectroscopy (UPS).

As used herein, the term "molecular weight" is measured in Daltons and represents the sum of the atomic weights for a monomeric compound; for oligomeric, polymeric compounds and their mixtures, "molecular weight" represents the weight-average molecular weight (Mw), as determined by gel permeation chromatography against polymer standards of poly(methyl methacrylate) for acrylic monomers, polystyrene for vinyl monomers; or, for the first compound used to make the polymerized units (b), the "molecular weight" is determined by nuclear magnetic resonance (NMR) spectroscopy.

As used herein, the term "oligomer" means a compound having two or more repeat units, such as, for example, from two to one hundred repeat units. As used herein, the term "oligomer" may include or overlap with polymers.

As used herein, the term "oligo(hydroxy fatty acid)" refers to oligoesters of two or more hydroxy fatty acid molecules linked by an ester formed by reaction of the hydroxyl group and the carboxyl group in the hydroxy fatty acid.

As used herein, the term "reliable" or "reliability" refers to the quality of a polymer composite that retains its quantum yield after aging or use for an extended time, for example, 30 days or 60 days at an elevated temperature of, for example, 60° C.

In accordance with the present invention, polymer composites contain quantum dots (QD) that are well and stably dispersed therein. The polymer composite comprises polymers formed from monomers of a first compound having one or more thiol groups and a second compound of acrylic or vinyl monomers having two or more polymerizable ethylenically unsaturated groups, such as vinyl or acrylic ester groups. A polymer composite without the first compound may have good $O_2$ barrier properties but has poor compatibility with QD. Poor compatibility between a polymer and the QD results in QD agglomeration which causes the composite to have a lower quantum yield (QY) or photoluminescence and red-shifting of peak wavelengths when compared to the QD in a native solvent or non-polar monomer or when compared to the same polymer composite of the same thickness and having the same amount of the same QD without the polymerized first compound. The first compound has very good compatibility with the second compound monomer and with QD, thereby enabling increased QY by minimizing QD agglomeration in a polymer composite. In addition, the first compound has one or more thiol group which reacts with acrylic and vinyl groups to forms crosslinked polymer resin during the curing process. As this is one a component polymer, there is no phase separation between the polymerized first compound and the polymerized second compound. As QD is uniformly dispersed inside the cured polymer composite film, the film has shorter red shift and better retention of quantum yield (QY) over time. In addition, the crosslinked polymer composite has higher film density, better reliability and oxygen barrier property than a multi-component polymer composite.

Quantum dots are well known in the art, see, e.g., U.S. patent publication no. US2012/0113672 A, to Dubrow et al. Preferably, the quantum dots in the polymer composite of the present invention are cadmium free quantum dots, or, more preferably, cadmium free core-shell quantum dots.

Suitable quantum dots and core-shell quantum dots may include any of those disclosed in any of U.S. Pat. No. 7,588,828 B2, to Mushtaq et al.; quantum dots disclosed in U.S. patent publication no. 2015/0236195 A1, to Guo et al, for example, the quantum dots containing indium enriched InP cores, such as those formed by contacting InP with an indium carboxylate (i.e., an indium (Ill) carboxylate), such as indium laurate; those disclosed in U.S. patent publication no. US2015/0166342 A1 to Mingjun et al.; the Group III-IV semiconductor nanostructures, such as in U.S. Pat. No. 7,557,028 B1 to Scher et al., U.S. Pat. No. 8,062,967 B1 to Scher et al., U.S. Pat. No. 8,884,273 B1 to Scher et al., or U.S. Pat. No. 9,469,538 B1 to Scher et al.; nanocrystals having cores with a Group IIIA and a Group VA element, such as in U.S. Pat. No. 9,136,428 B2 to Clough et al.; the nanoparticles disclosed in U.S. Pat. No. 9,212,056 B2 to Breen et al.; or the nanocrystalline materials disclosed in U.S. Pat. No. 6,322,901 B1 to Bawendi et al.

Acceptable efficiency (PLQY) for a cadmium free quantum dot material is above 40%, or, preferably, above 60%, or, more preferably, 75% or higher, such as from 75 to 95%.

Preferably, the first compound (b) has a molecular weight of from 300 to 20,000, preferably at least 400, preferably at least 500, preferably at least 600, preferably at least 700, preferably at least 800, preferably at least 1,000; preferably no more than 15,000, preferably no more than 10,000, preferably no more than 8,000, preferably no more than 6,000, preferably no more than 5,000, preferably no more than 3,000.

Suitable first compounds may include, for example, monomeric, or oligomeric adducts of N-alkylamine thiols with $C_{12}$-$C_{26}$ aliphatic hydroxycarboxylic acids, such as oligo(12-hydroxystearic acid) adducts with N-alkylamine thiols, such as N-ethylamine thiol, or thiol group containing amino acids, such as cysteine; adducts of N-alkylamine thiols or thiol group containing amino acids with $C_{12}$-$C_{26}$ aliphatic carboxylic acids; and adducts of thio alkylcarboxylic acids, such as mercaptopropionic acid, with any of $C_{12}$-$C_{26}$ aliphatic diols, (thereby containing two thiol groups), with $C_{12}$-$C_{26}$ aliphatic triols, thereby containing three thiol groups, or with dimers of the $C_{12}$-$C_{26}$ aliphatic triols, thereby containing four thiol groups.

When the first compound used to make the polymerized units (b) is an oligomer wherein each repeating unit contains a thiol group, such as adducts of thio alkylcarboxylic acids with oligomers of $C_4$ to $C_{16}$ hydroxyalkyl (meth)acrylates, the number of thiol groups in the first compound is the number average of repeating units of monomer in the oligomer distribution.

When the first compound used to make the polymerized units (b) is a monomer made by adducting thiol groups containing compounds onto a molecule, the number of thiol groups is determined by the number of adduction sites on the molecule. For example, adducts of thio alkylcarboxylic acids with $C_{12}$-$C_{26}$ aliphatic diols have two thiol groups; and adducts of thio alkylcarboxylic acids with $C_{12}$-$C_{26}$ aliphatic triols have three thiol groups.

When the first compound used to make the polymerized units comprises thiol groups grafted on or chemically linked into the first compound, such as by amidation, peptidization or esterification, then the number of thiol groups in the first compound is that amount as determined by nuclear magnetic resonance (NMR) spectroscopy.

The first compound used to make the polymerized units (b) has at least one continuous acyclic hydrocarbyl chain of at least three carbon atoms or, preferably, at least five carbon atoms, i.e., a straight or branched (preferably straight) chain having at least five methylene groups, olefinic carbons or a combination thereof, and no heteroatoms. Preferably, the continuous acyclic hydrocarbyl chain has at least six carbon atoms, preferably at least seven, preferably at least eight; preferably no more than fifteen, preferably no more than fourteen, preferably no more than thirteen. More preferably, the continuous acyclic hydrocarbyl chain contains only methylene groups.

Preferably, the first compound used to make the polymerized units (b) has only carbon, hydrogen, oxygen, sulfur and nitrogen atoms.

More preferably, the first compound used to make the polymerized units (b) has only carbon, hydrogen, oxygen, and sulfur atoms.

Preferably, the first compound used to make the polymerized units (b) is aliphatic.

Preferably, the second compound used to make the polymerized units (c) has a molecular weight of at least 150, preferably at least 200, preferably at least 250; preferably no more than 650, preferably no more than 500, preferably no more than 400, preferably no more than 350.

Preferably, the molecular weight of the first compound minus that of the second compounds is at least 300, preferably at least 500, preferably at least 700, preferably at least 900, preferably at least 1,100; preferably no greater than 19,900, preferably no greater than 15,000, preferably no greater than 10,000, preferably no greater than 5,000.

When the polymer composite of the present invention comprises more than one first compound and/or more than one second compound, the preceding limits on the molecular weight difference apply only to the most prevalent combinations of a first compound and a second compound whose amounts total at least 50 wt. %, based on the total solids weight of the composite, preferably, at least 75 wt. %.

When in the second compound used to make the polymerized units (c), a polymerizable vinyl group is attached to an aromatic ring (e.g., a benzene, naphthalene or pyridine ring), preferably the aromatic ring has from three to twenty carbon atoms, or, preferably from five to fifteen carbon atoms. Preferably, the aromatic ring contains no heteroatoms and has from six to fifteen carbon atoms, preferably from six to twelve carbon atoms.

Preferably, the second compound used to make the polymerized units (c) has from two to six polymerizable vinyl groups, or, more preferably no more than four.

Preferably, the polymerizable vinyl groups in the second compound are (meth)acrylate ester groups ($CH_2$=C(R)C(O)O—, where R is H or $CH_3$; also known as (meth)acryloyloxy).

Preferably, the second compound has only carbon, hydrogen, oxygen and nitrogen atoms; or, more preferably, only carbon, hydrogen and oxygen atoms.

Preferably, the second compound has (meth)acrylate ester groups or the second compound is divinylbenzene (DVB).

Especially preferred second compounds include tricyclo[5.2.1.0$^{2,6}$] decane dimethanol diacrylate, Bisphenol A dimethacrylate, 2-butyl-2-ethyl-1,3-propanediol dimethacrylate, 1,10-bis(acryloyloxy)decane and

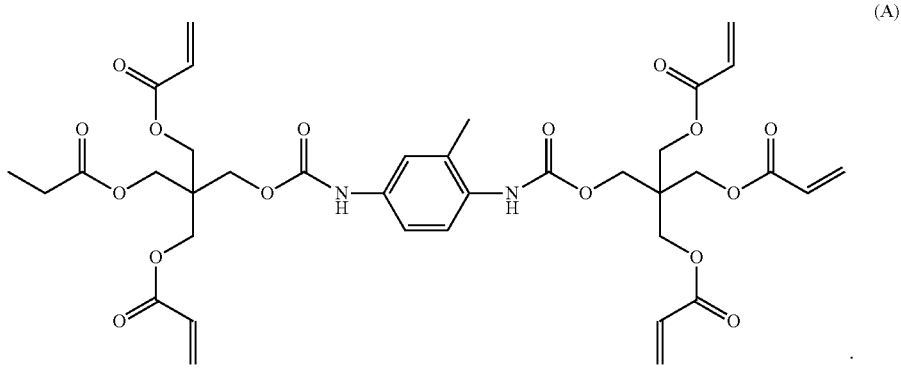 [SMILES: C=CC(=O)OCC(COC(=O)C=C)(COC(=O)CC)COC(=O)Nc1ccc(NC(=O)OCC(COC(=O)C=C)(COC(=O)C=C)COC(=O)C=C)c(C)c1]

(A)

Preferably, the polymer composite further comprises polymerized units (d) of a third compound having one (meth)acrylate group and a molecular weight from 100 to 270; preferably at least 140, preferably at least 160; preferably no greater than 250, preferably no greater than 230. Preferably, the third compound is an aliphatic or cycloaliphatic monomer, such as isobornyl acrylate (IBOA).

Especially preferred third compounds include isobornyl acrylate, 3,5,5-trimethylhexyl acrylate, dodecyl acrylate, decyl acrylate, tridecyl acrylate, isodecyl acrylate, L-menthyl acrylate, tricyclo[5.2.1.0$^{2,6}$]decylmethyl acrylate, 3,3,5-trimethylcyclohexyl methacrylate and 3,3,5-trimethylcyclohexyl methacrylate.

Preferably, the polymer composite of the present invention is part of a multilayer film, laminate or assembly which also comprises an outer layer on each side of the polymer composite. Preferably, the outer layer is an oxygen barrier which also inhibits passage of moisture. Preferably, the outer layer comprises a polymer composite, preferably one comprising polyethylene terephthalate (PET), polyaryletherketones, polyimides, polyolefins, polycarbonate, polymethyl methacrylate (PMMA), polystyrene, or a combination thereof. Preferably, the outer layer further comprises oxides or nitrides, preferably silicon oxides, titanium dioxide, aluminum oxide, silicon nitrides or a combination thereof. Preferably the oxides or nitrides are coated on the surface of the polymer composite facing the QD layer Preferably, each outer layer comprises a polymer composite having a thickness from 25 to 150 microns (preferably 50 to 100 microns) and an oxide/nitride layer having a thickness from 10 to 100 nm (preferably 30 to 70 nm).

In accordance with the present invention, the outer layer of a multilayer film, laminate or assembly preferably comprises at least two polymer composite layers and/or at least two oxide/nitride layers. In any multilayer film of the present invention, different layers may be of differing composition. Preferably, the outer layers have a very low oxygen transmission rate (OTR, <10$^{-1}$ cc/m$^2$/day) and low water vapor transmission rate (WVTR, <10$^{-2}$ g/m$^2$/day).

Preferably, the polymer composite in the outer layers has a Tg from 60 to 200° C.; or, more preferably, at least 90° C., or, most preferably, at least 100° C.

Preferably, the thickness of a polymer composite in accordance with the present invention ranges from 20 to 500 microns, preferably at least 50 microns, preferably at least 70 microns, preferably at least 80 microns, preferably at least 90 microns; preferably no greater than 400 microns, preferably no greater than 300 microns, preferably no greater than 250 microns, preferably no greater than 200 microns, preferably no greater than 160 microns. Preferably, the thickness of each outer layer is from 20 to 100 microns, preferably from 25 to 75 microns.

Preferably, the polymer composite of this invention is prepared by free radical polymerization of the resin prepared by mixing the first compound, the second compound, any other monomers, one or more QDs and any optional additives. Preferably, the resin is coated on a first outer layer prior to curing by typical methods, e.g., spin coating, slot die coating, gravure, ink jet and spray coating. Preferably, curing is initiated by exposing the resin to ultraviolet light or heat, preferably ultraviolet light, preferably in the UVA range.

Preferably, the polymer composite of this invention comprises from 0.01 to 5 wt % of quantum dots, preferably at least 0.03 wt %, preferably at least 0.05 wt. %; preferably no more than 4 wt. %, or, preferably no more than 3 wt. %, or, more preferably no more than 2 wt %. Preferably, quantum dots comprise CdS, CdSe, CdTe, ZnS, ZnSe, ZnTe, HgS, HgSe, HgTe, GaN, GaP, GaAs, InP, InAs or a combination thereof. Preferably, the quantum dots are cadmium-free. More preferably, the quantum dots are core-shell quantum dots, such as core-shell cadmium-free quantum dots, particularly core-shell quantum dots containing indium containing cores.

The quantum dots of the present invention preferably comprise a non-polar ligand. Preferably, ligands surrounding the inorganic part of quantum dots have non-polar components, such as aliphatic hydrocarbon groups. Preferred ligands include, for example, trioctyl phosphine oxide, dodecanethiol and fatty acid salts (e.g., stearate salts, oleic acid salts).

Other additives which may be incorporated into the polymer composite of the present invention include ultraviolet (UV) stabilizers, antioxidants, scattering agents to improve light extraction, and thickeners to increase viscosity (e.g., urethane acrylate oligomers).

Preferred thickeners include urethane acrylates, cellulose ethers, cellulose acrylic esters, polystyrene polymers, polystyrene block copolymers, acrylic resin and polyolefin elastomers. Preferably, polystyrene, acrylic and polyolefin thickeners have a Mw ranging from 50,000 to 400,000; preferably from 100,000 to 200,000. Preferably, cellulose ethers have Mw ranging from 1,000 to 100,000.

Urethane acrylate oligomers can have polyester, polyether, polybutadiene, or polycaprolactone backbones between the acrylate groups they contain. They can have difunctional, trifuctional, hexafunctional reactivities. Viscosities of such oligomers can range from 1000 to 200,000 cPs at 50 C. For non-polar ligand QDs, polybutadiene urethane acrylate oligomers are preferred.

Preferred forms for the polymer composite include, e.g., composites, beads, strips, rods, cubes and plates. The polymer composite is useful in many applications, including, e.g., displays, lighting and medical applications. Preferred display applications include public information displays, signage, televisions, monitors, mobile phones, tablets, laptops, automotive and other dashboards, and watches.

EXAMPLES

The following examples illustrate the present invention. Unless otherwise indicated, all units of temperature are room temperature and all units of pressure are standard pressure or 101 kPa.

The following test methods were used:

O$_2$ permeability (cc/m/day/atm) of the indicated polymeric films was measured using a Mocon OX-TRAN model 2/21 device (Mocon, Inc., Minneapolis, Minn.). The method details are outlined in ASTM Method D3985 (Standard Test Method for Oxygen Gas Transmission Rate through a Plastic Film and Sheeting Using a Coulometric Sensor, Jan. 30, 1981) using a test gas of 3% O$_2$ and 97% N$_2$ at 23° C. The measurements were taken from films made in the manner disclosed below and having a 10 wt. % loading of the indicated first compound.

Film thicknesses were determined by measurement of the cured films with a micrometer and then subtracting out the thickness of any barrier film thickness.

Photoluminescent Quantum Yield (PLQY) was measured with a custom integrating sphere using a 450 nm excitation LED light source and a Hamamatsu Absolute™ PL quantum yield spectrometer (Hamamatsu Photonics KK, Shizuoka, Japan). For each reported example a total of three (3) measurements were taken from three (3) randomly selected points in each analyte substrate and the indicated PLQY represents an average of the measurements taken.

Peak emission wavelength (PWL) was determined using a Hamamatsu integrating sphere; for green QD in the examples, below, the target wavelength is from 520 to 540 nm; for red QD, the target wavelength is from 620 to 640 nm.

Abbreviations used in Examples:

OHS is oligo(12-hydroxystearic acid), Mw=1,500; OHS-SH is oligo(12-hydroxystearic acid) containing a single thiol group, Mw=1,500; C is cysteine; IBOA is isobornyl acrylate; SR833 is tricyclo [5.2.1.0$^{2,6}$] decane dimethanol diacrylate; I-819 and I-651 are IRGACURE photoactive polymerization initiators (BASF AG, Leverkusen, Del.); Finex™ zinc oxide particles (Sakai Chemical Industry co., LTD., Japan); and CFQD stands for cadmium free quantum dots. Green CFQD comprise core-shell QDs having Indium containing cores and exhibit an 73.9% QY (PLOY), 44.1 nm FWHM, and a 534.4 nm PWL (at absorbance=0.3). All quantum dots further comprise a non-polar ligand.

The OHS with one carboxyl acid group and one hydroxyl group is modified by the incorporation of thiol group through cysteine via a peptide reaction. To prepare OHS-SH, the OHS (9.115 g, 6.2 mmol) and N-hydroxysuccinimide (NHS, 1.8 g, 15.5 mmol, 2.5 molar eq.) were mixed together in 40 mL of anhydrous toluene under an $N_2$ atmosphere. A solution of disodium ethylenediamine tetraacetate dihydrate (EDTA disodium salt, 3 g, 15.5 mmol, 2.5 molar eq.) in dimethylformamide (DMF) (60 mL) was slowly added using a pressure-equalized addition funnel. The solution was maintained at 20° C. for 24 h to complete the activation of all carboxyl groups. 3.8 g cysteine (31 mmol, 5 molar eq.) was dissolved in anhydrous DMF (120 ml) and then mixed with trimethylamine (1.6 g, 15.5 mmol, 2.5 molar eq.). The resulting mixture was slowly charged into the NHS-activated polymer solution under $N_2$ and further stirred for 24 h. The DMF was then removed and the final product was extracted using toluene, and washed with a saturated NaCl solution. Finally, toluene was removed under $N_2$ purge and the product was dried in vacuum oven at RT overnight.

Example 1

All indicated polymer composites were films that were prepared by lamination of the indicated resin formulations between two i-Component PET barrier films. Approximately 2 mL of resin was dispensed on the bottom film and was drawn down with a gap coating bar having a 250 to 300 (10 mil-12 mil) gap to insure the desired film thickness. All formulations were cured using a DRS-10/12 QNH at 500 mJ/cm$^2$ UV curing intensity (Fusion UV Systems, Inc., Gaithersburg, Md.).

Formulations are indicated in Table 1, below. Such formulations were made by blending the indicated second compound monomer and a photoinitiator together, followed by mixing the first compound or a comparative compound not containing a thiol group with the second compound monomer and heating the resulting mixture to 50° C. for 15 mins. A second compound monomer IBOA (Isobornyl acrylate) was then blended with the indicated QD into the mixture. The mixture was formed or poured into the film, as disclosed in the prior paragraph, and then cured under UV light for about 3 s. Quantum yield results are shown in Table 2, below.

Example 3 and Comparative Example 3A

In each example, oxygen permeability was determined for each of two films made using the formulation in Table 1, below, and in the manner disclosed in Example 1, above, except that the film was formulated with a 10 wt. % loading of the first compound or indicated comparative compound. The results reported are the average of the two films. Oxygen permeability results are shown in Table 3, below.

TABLE 1

Formulations

| EXAMPLE | PHS (wt. %) | PHS-SH (wt. %) | PI-819 (wt. %) | SR833 (wt. %) | IBOA (wt. %) | Green CFQD (wt. %) | Finex (wt. %) |
|---|---|---|---|---|---|---|---|
| 1A* | 6 | | 1.5 | 85.5 | 5 | 0.5 | 2 |
| 1B*-Control | | | 1.5 | 91.5 | 5 | 0.5 | 2 |
| 2 | | 6 | 1.5 | 85.5 | 5 | 0.5 | 2 |

*Denotes Comparative Example.

TABLE 2

Quantum Yield Results

| EXAMPLE | | PLQY (%) | Abs | PWL (nm) |
|---|---|---|---|---|
| 1B* | Control | 38 | 0.46 | 544 |
| 1A* | 6 wt. % OHS | 45 | 0.42 | 534 |
| 2 | 6 wt. % OHS-SH | 43 | 0.43 | 534 |

*Denotes Comparative Example.

As shown in Table 2, above, the quantum yield of the inventive polymer films in Examples 2 is superior to the control. The peak wavelengths are similar in Examples 2 and 1A, indicating a reasonably low red-shift in the compositions of the present invention. Further, the peak Absorbance of the film of inventive Example 2 is superior to that of the Comparative Example 1A, indicating that the QDs are better dispersed in Example 2 than Example 1B.

TABLE 3

Oxygen Permeability

| Example 3 - $O_2$ permeability (cc/m/day/atm) of film with 10% OHS-SH | Comparative Example 3A* - $O_2$ permeability (cc/m/day/atm) of film with 10% OHS |
|---|---|
| 0.021 ± 0.002 | 0.030 ± 0.003 |

*Denotes Comparative Example.

As shown in Table 3, above, the oxygen permeability of films made in accordance with the present invention is dramatically lower than a film of the same compositions having a hydroxyl fatty acid first compound without a thiol group. The results indicate that the QD composition is well-dispersed in the cured polymer composite and is more reliable than the composition of Comparative Example 3A.

The invention claimed is:

1. A polymer composite having dispersed therein quantum dots, the polymer composite comprising: (a) quantum dots; (b) polymerized units of a first compound comprising from one to 6 thiol groups and having a molecular weight from 300 to 20,000 and having at least one continuous acyclic hydrocarbyl chain of at least three carbon atoms; and (c) polymerized units of a second compound having a molecular weight from 100 to 750 and comprising at least two polymerizable vinyl groups as part of a (meth)acrylate ester group or attached directly to an aromatic ring and, wherein the molecular weight of the first compound minus the molecular weight of the second compound is at least 100.

2. The polymer composite as claimed in claim 1 in which the (a) quantum dots are cadmium-free quantum dots.

3. The polymer composite as claimed in claim 1 in which the first compound used to make the polymerized units (b) comprises at least one continuous acyclic hydrocarbyl chain of at least five carbon atoms.

4. The polymer composite as claimed in claim 1 in which the first compound used to make the polymerized units (b) further comprises at least one hydroxyl group.

5. The polymer composite as claimed in claim 1 in which the first compound used to make the polymerized units (b) comprises any of an oligomeric or polymeric adduct of an N-alkylamine thiol or a thiol group containing amino acid with a $C_{12}$-$C_{26}$ aliphatic hydroxycarboxylic acid; an adduct of an N-alkylamine thiol or a thiol group containing amino acid with a $C_{12}$-$C_{26}$ aliphatic carboxylic acid; an adduct of a thio alkylcarboxylic acid with a $C_{12}$-$C_{26}$ aliphatic diol or triol; or an adducts of a thio alkylcarboxylic acid with oligomers of one or more $C_4$ to $C_{16}$ hydroxyalkyl (meth) acrylates.

6. The polymer composite as claimed in claim 4 in which the first compound used to make the polymerized units (b) is an oligo (hydroxy fatty acid) amide having a terminal thiol group, wherein the fatty acid chain contains a hydroxyl group located three or more carbons from the end of the fatty acid chain.

7. The polymer composite as claimed in claim 6 in which the first compound used to make the polymerized units (b) is the thiolethylamide of 12-hydroxystearic acid or the thiolethylamide of oligo(12-hydroxystearic acid).

8. The polymer composite as claimed in claim 1 in which the second compound used to make the polymerized units (c) comprises a monomer chosen from one having (meth) acrylate ester groups attached to an aromatic ring or a cycloaliphatic group, one having vinyl groups directly attached to an aromatic ring or a cycloaliphatic group, or mixtures thereof.

9. The polymer composite as claimed in claim 1 in which the second compound used to make the polymerized units (c) is chosen from tricyclodecane dimethanol diacrylate, isobornyl dimethacrylate, divinyl benzene, or mixtures thereof.

10. The polymer composite as claimed in claim 1 in which the polymer composite comprises (a) from 0.001 to 5 wt. % of quantum dots, (b) from 0.5 to 40 wt. % of polymerized units of the first compound, and (c) from 55 to 94.999 wt. % of polymerized units of the second compound.

* * * * *